(12) United States Patent
Pfeifer et al.

(10) Patent No.: US 7,552,581 B1
(45) Date of Patent: Jun. 30, 2009

(54) ARTICULATING CABLE CHAIN ASSEMBLY

(75) Inventors: Alan T. Pfeifer, Wichita, KS (US); Ryan Signer, Derby, KS (US); John Dunham, Kechi, KS (US); Ben Karsak, Rose Hill, KS (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 12/208,182

(22) Filed: Sep. 10, 2008

(51) Int. Cl.
*F16G 13/16* (2006.01)
*H02G 11/00* (2006.01)

(52) U.S. Cl. ........................ 59/78.1; 59/900; 248/49; 248/51

(58) Field of Classification Search ............... 59/78.1, 59/900; 248/49, 51
See application file for complete search history.

(56) References Cited

U.S. PATENT DOCUMENTS

| | | | |
|---|---|---|---|
| 4,392,344 A * | 7/1983 | Gordon et al. | 59/78.1 |
| 6,374,589 B1 * | 4/2002 | Kunert et al. | 249/49 |
| 6,787,702 B2 * | 9/2004 | Suzuki | 59/78.1 |
| 7,484,351 B2 * | 2/2009 | Harada et al. | 248/49 |

* cited by examiner

*Primary Examiner*—David B Jones
(74) *Attorney, Agent, or Firm*—William W. Cochran; Cochran Freund & Young LLC

(57) ABSTRACT

Disclosed is an articulated cable chain 102 that has a flat spring that initiates a first folding curve that holds the articulated cable chain 102 in a tight radius. Once the first folding curve 122 is properly initiated, the remaining folding curves in the articulated cable chain 102 are folded at the proper locations and have a small radii, even though the cable within the articulated cable chain tends to cause the cable chain to maintain a straighter configuration.

4 Claims, 4 Drawing Sheets

ARTICULATING CABLE CHAIN ASSEMBLY

BACKGROUND OF THE INVENTION

Customer replaceable units have provided a convenient and simple of way of replacing appliances such as disk drives in servers, RAID devices, etc. Drives, such as hot spares, mirror drives in a RAID unit, or any type of replacement drive can be easily removed or replaced using customer replaceable unit devices. Disk drives can be plugged and unplugged from the chassis of RAID units, servers, computers, etc. with cables having connectors that connect to the back of the unit. Hence, the customer replaceable unit devices have been found to be a practical and convenient way to replace appliances, such as disk drives, that are utilized in the computer and electronics industry.

SUMMARY OF THE INVENTION

An embodiment of the present invention may therefore comprise a method of folding an articulated cable chain that is connected to a customer replaceable unit in a customer replaceable unit chassis comprising: assembling said cable chain from a plurality of chain links that have a limited arc of rotation, said chain links periodically reversed on said articulated cable chain so that said articulated cable chain forms a plurality of folding curves in sequentially opposite directions along said articulated cable chain when said articulated cable chain is in a retracted position and said customer replaceable unit is in a closed position in said customer replaceable unit chassis, and so that said articulated cable chain can expand to a substantially straight orientation when said customer replaceable unit is in an open position in said customer replaceable unit chassis; providing a flat spring having a predetermined radius with slots formed proximally to ends of said flat spring; placing studs through said slots to secure said flat spring to said cable chain; attaching said studs to predetermined links of said plurality of chain links in said articulated cable chain so that said articulated cable chain substantially conforms to said predetermined radius of said flat spring; moving said customer replaceable unit to an open position to extend said cable chain so that said studs move in said slots which allows said flat spring to flex against said articulated cable chain and generate a force on said articulated cable chain; moving said customer replaceable unit to a closed position so that said force generated by said flat spring on said articulated cable chain initiates a first folding curve in said articulated cable chain and causes said articulated cable chain to fold into a first holding curve that substantially matches said predetermined radius of said flat spring, and also causes additional folding curves to be formed in said articulating cable chain that have a radius that substantially matches said predetermined radius.

An embodiment of the present invention may further comprise an articulated cable chain comprising: a customer replaceable unit that is attached to a first end of said articulating cable chain; a customer replaceable unit chassis that is attached to a second end of said articulating cable chain; a plurality of chain links connected to form said articulated cable chain that have a limited arc of rotation, said chain links being periodically reversed on said articulated cable chain to form a plurality of folding curves in sequentially opposite directions along said articulated cable chain; a flat spring having a predetermined radius with slots formed proximally to ends of said flat spring; studs that pass through said slots and attach to predetermined links of said plurality of links that forms said articulated cable chain so that said articulated cable chain substantially conforms to said flat spring such that said flat spring flexes against said articulated cable chain when said articulated cable chain is extended and initiates a first folding curve that substantially matches said predetermined radius of said flat spring and causes additional folding curves to be formed in said articulating cable chain that have a radius that substantially matches said predetermined radius.

DETAILED DESCRIPTION OF THE EMBODIMENTS

Figure 1A:
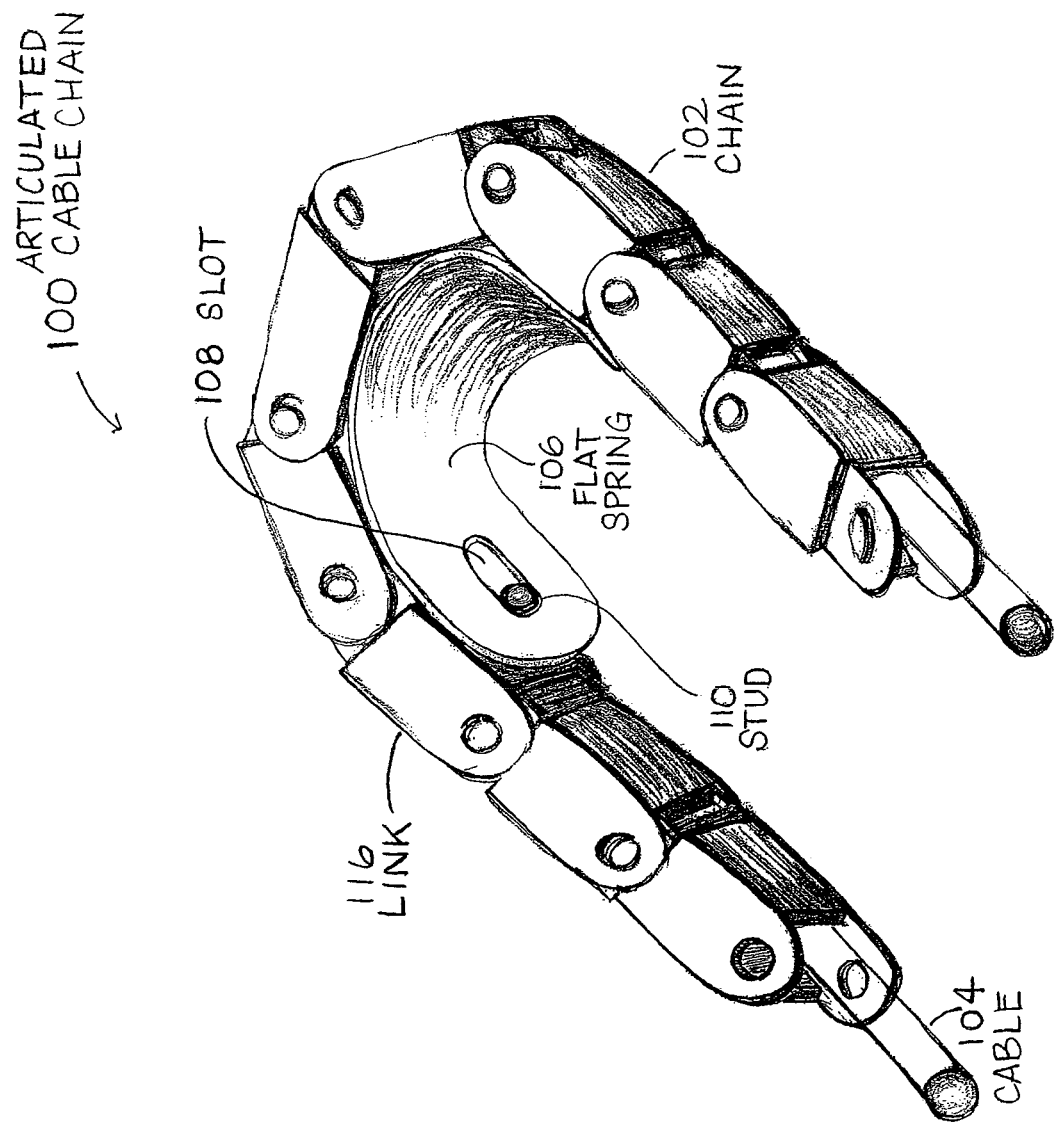
FIG. 1A is a schematic perspective view of an embodiment of a cable chain that is engaged by a flat spring to form a tight radius folding curve.

FIG. 1A is a schematic illustration of a cable chain 100 that includes an articulated cable chain 102 and a cable 104 that is disposed within the interior portion of the articulated cable chain 102. The articulated cable chain 102 provides protection for the cable by limiting wear of the cable 104 as a result of movement of the cable 104. The chain 102 also assists in folding the cable in a series of sequential opposite curves in a repeating "S" formation, so that the cable does not become entangled during movement.

As shown in FIG. 1A, flat spring 106 is formed with a predetermined radius to fold the cable chain 100, so that the cable chain 100 has a radius that substantially matches the radius of the flat spring 106. For example, a radius of 1 inch may be desirable to fold the cable chain 100. Stud 110 is connected to link 116 through the slot 108 to hold the flat spring 106 to the cable chain 100.

Figure 1B:
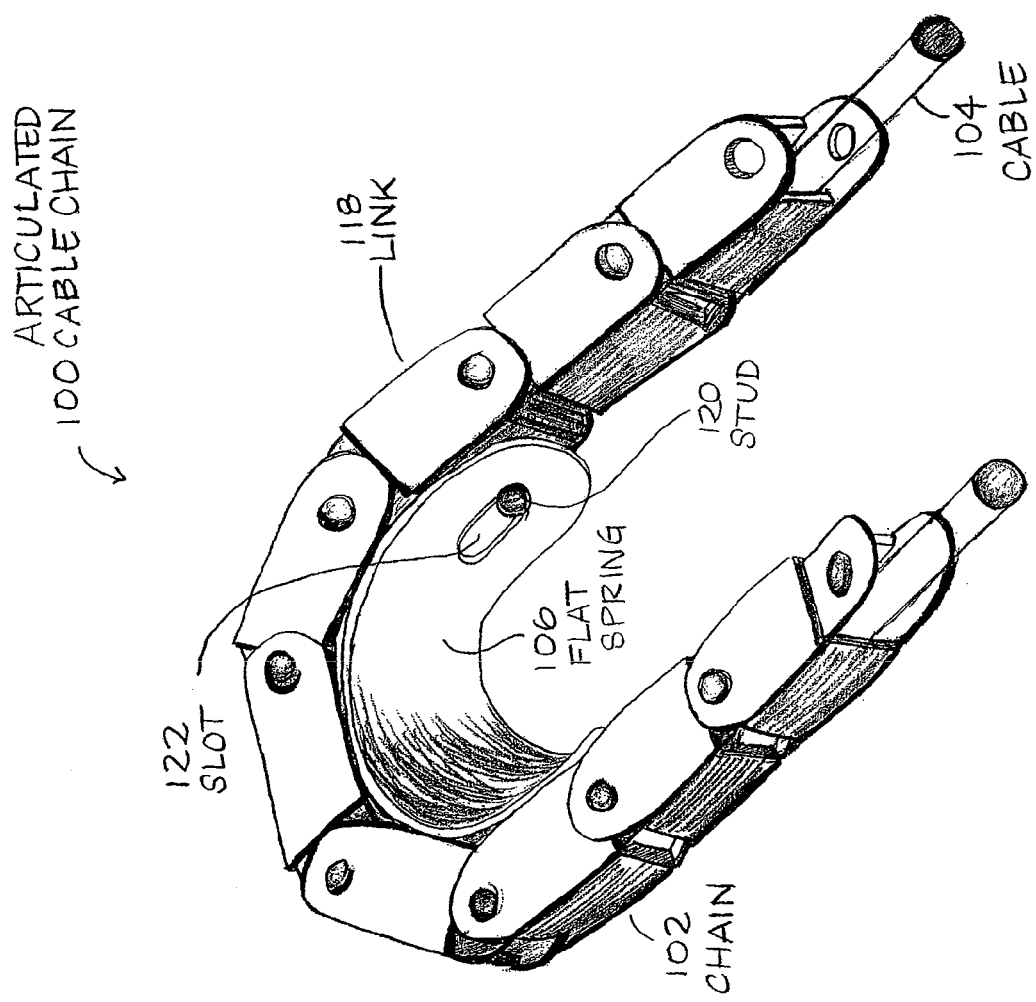
FIG. 1B is a schematic perspective view of the embodiment of FIG. 1A from a different angle than shown in FIG. 1A.

FIG. 1B is a perspective view of the articulated cable chain of FIG. 1A viewed from a different angle. As shown in FIG. 1B, stud 120 is connected to link 118 through slot 122 to hold the other end of the flat spring 106 to the cable chain 100. The slots 108, 122 allow the studs 110, 120 to move within the slots 108, 122 as the articulated cable chain 100 is extended and retracted. Since the radius of curvature of the flat spring 106 is slightly less than the radius of curvature of the cable chain 100, which is disposed on the outside of the flat spring 106, slots 108, 122 must be provided to allow for movement between the cable chain 100 and the flat spring 106, as the flat spring 106 is flexed from a resting position, such as shown in FIGS. 1A and 1B to a flexed, open position when the cable chain 100 is in an extended position, as disclosed below.

Figure 2:
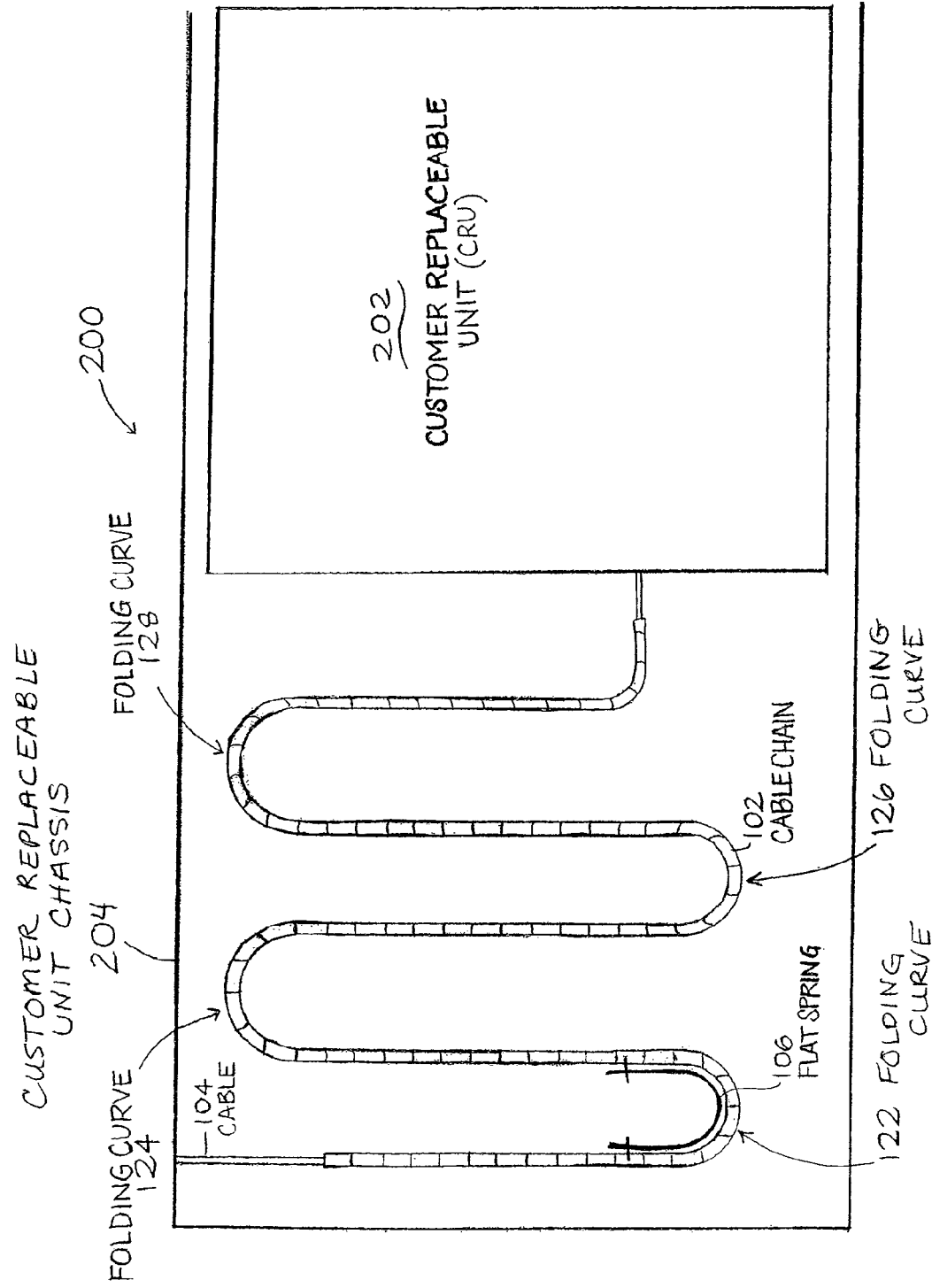
FIG. 2 is a schematic plan view of an articulated cable chain assembly disposed in a chassis of a customer replaceable unit with the customer replaceable unit in a closed position.

FIG. 2 is a schematic plan view of an articulated chain cable 102 that is shown folded in a customer replaceable unit chassis 204. As shown in FIG. 2, the articulated cable chain 102 covers the cable 104. Cable 104 is connected to the customer replaceable unit chassis 204 at one end and to the customer replaceable unit (CRU) 202 at the other end. As shown in FIG. 2, the cable chain 102 is folded to form a series of interlinking folds in the cable chain 102 that curve in opposite directions sequentially along the length of the cable chain 102. The cable chain links that form the articulated cable chain 102 have a limited arc of rotation so that the cable links rotate in only one direction. The links are assembled to form the articulated cable chain 102, so that the plurality of folding curves of the articulated cable chain 102 are sequentially reversed to produce the plurality of folding curves in sequentially opposite directions along the length of the articulated cable chain 102, illustrated in FIG. 2. As shown in FIG.

2, it is desirable to ensure that the folding curves 122, 124, 126, 128 are tightly formed and are properly initiated when the customer replaceable unit (CRU) 202 is in an extended or open position in the customer replaceable unit chassis 204 and begins to move to a retracted position, such as illustrated in FIG. 2. If the folding curves in the articulated cable chain 102 are not properly initiated, the articulated cable chain 102 may not properly initiate a folding action, which may prevent the customer replaceable unit from being retracted into the customer replaceable unit chassis 204 in the manner illustrated in FIG. 2. Alternatively, some portions of the articulated cable chain 102 may fold to create the folded curves 122-128, while other portions may not fold properly if the first folding curve in the articulated cable chain 102 is not initiated properly and does not have the proper radius.

FIG. 2 illustrates the manner in which the flat spring 106 causes the articulated cable chain 102 to be folded into a tight radius, as shown by folded curve 122. The first curve 122, that is closest to the point at which the cable 104 is attached to the customer replaceable unit chassis 204, initiates the proper folding of the articulated chain 102. In that regard, the tight radius of the first folded curve 122 causes the additional folded curves 124, 126, 128 to properly fold into tight radii, as illustrated in FIG. 2. In this manner, both the initiation of the first folded curve 122 and the tight radius of the first folded curve 122 that is created by the flat spring 106 causes the remaining portion of the articulated cable chain 102 to fold in the manner shown in FIG. 2.

Figure 3:
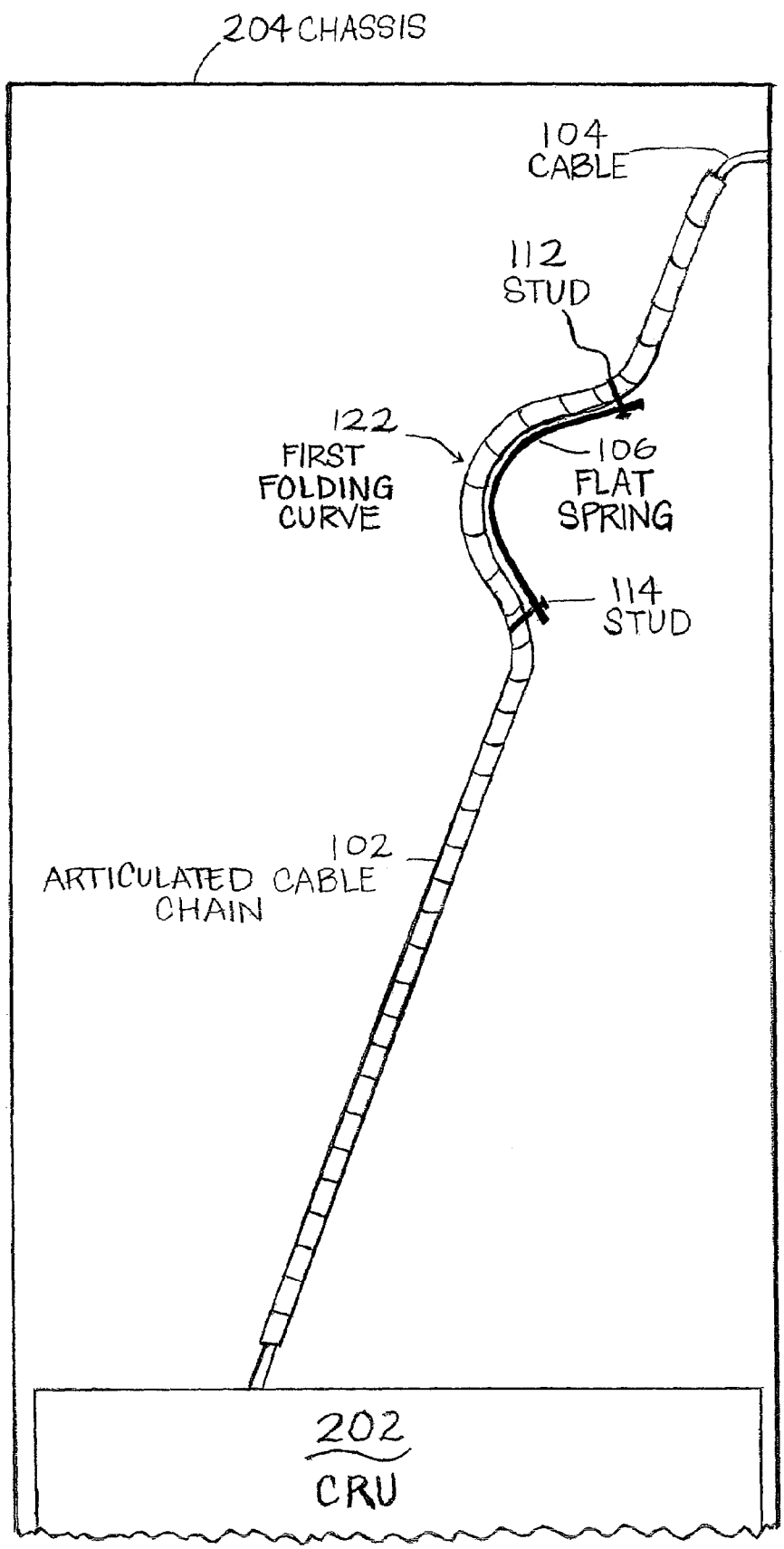
FIG. 3 is a schematic top view of the articulating cable chain assembly of FIG. 2 shown with the customer replaceable unit in an open position in a chassis.

FIG. 3 is a schematic illustration of the customer replaceable unit 202 in an extended position in the chassis 204. As shown in FIG. 3, the flat spring 106 is flexed outwardly by the extension of the articulated cable chain 102, which is caused by the customer replaceable unit 202 being extended to an open position in the chassis 204. Studs 112, 114 hold the flat spring 106 against the articulated cable chain so that the first folding curve 122 is properly initiated in the articulated cable chain 102. Studs 112, 114 hold the flat spring 106 against the articulated cable chain 102 to generate a force against the surface of the articulated cable chain 102 to initiate the first folding curve 122. In this manner, the entire process of folding the articulated cable chain 102 when the customer replaceable unit 202 is pushed to a closed position is initiated properly and causes the articulated cable chain 102 to fold to create the first folding curve 122 at the proper location along the length of the articulated cable chain 102. Again, once the first folding curve 122 is properly initiated, the remaining folds will be initiated properly and have a small radius, such as the radius that is created by the flat spring 106, as shown in FIG. 2.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of folding an articulated cable chain that is connected to a customer replaceable unit in a customer replaceable unit chassis comprising:
   assembling said cable chain from a plurality of chain links that have a limited arc of rotation, said chain links periodically reversed on said articulated cable chain so that said articulated cable chain forms a plurality of folding curves in sequentially opposite directions along said articulated cable chain when said articulated cable chain is in a retracted position and said customer replaceable unit is in a closed position in said customer replaceable unit chassis, and so that said articulated cable chain can expand to a substantially straight orientation when said customer replaceable unit is in an open position in said customer replaceable unit chassis;
   providing a flat spring having a predetermined radius with slots formed proximally to ends of said flat spring;
   placing studs through said slots to secure said flat spring to said cable chain;
   attaching said studs to predetermined links of said plurality of chain links in said articulated cable chain so that said articulated cable chain substantially conforms to said predetermined radius of said flat spring;
   moving said customer replaceable unit to an open position to extend said cable chain so that said studs move in said slots which allows said flat spring to flex against said articulated cable chain and generate a force on said articulated cable chain;
   moving said customer replaceable unit to a closed position so that said force generated by said flat spring on said articulated cable chain initiates a first folding curve in said articulated cable chain and causes said articulated cable chain to fold into a first folding curve that substantially matches said predetermined radius of said flat spring, and also causes additional folding curves to be formed in said articulating cable chain that have a radius that substantially matches said predetermined radius.

2. The method of claim 1 further comprising:
securing said flat spring to said articulating cable chain by forming said flat spring so that said flat spring fits between faces of said chain links.

3. An articulated cable chain comprising:
a customer replaceable unit that is attached to a first end of said articulating cable chain;
a customer replaceable unit chassis that is attached to a second end of said articulating cable chain;
a plurality of chain links connected to form said articulated cable chain that have a limited arc of rotation, said chain links being periodically reversed on said articulated cable chain to form a plurality of folding curves in sequentially opposite directions along said articulated cable chain;
a flat spring having a predetermined radius with slots formed proximally to ends of said flat spring;
studs that pass through said slots and attach to predetermined links of said plurality of links that forms said articulated cable chain so that said articulated cable chain substantially conforms to said flat spring and said flat spring flexes against said articulated cable chain when said articulated cable chain is extended and initiates a first folding curve that substantially matches said predetermined radius of said flat spring and causes additional folding curves to be formed in said articulating cable chain that have a radius that substantially matches said predetermined radius.

4. The articulated cable chain of claim 3 further comprising:
flat portions of said chain links that hold said flat spring proximally to said articulating cable chain.

* * * * *